(12) United States Patent
Ohkoshi et al.

(10) Patent No.: US 7,781,082 B2
(45) Date of Patent: Aug. 24, 2010

(54) MAGNETIC MATERIAL (75) Inventors: Shin-ichi Ohkoshi, Tokyo (JP);
Shunsuke Sakurai, Tokyo (JP); Shiro Kuroki, Saito (JP); Kimitaka Sato, Honjyo (JP); Shinya Sasaki, Okayama (JP)

(73) Assignees: The University of Tokyo, Tokyo (JP); Dowa Electronics Materials Co., Ltd., Tokyo (JP)

( * ) Notice: Subject to any disclaimer, the term of this patent is extended or adjusted under 35 U.S.C. 154(b) by 0 days.

(21) Appl. No.: 11/892,911

(22) Filed: Aug. 28, 2007

(65) Prior Publication Data
US 2008/0057352 A1 Mar. 6, 2008

(30) Foreign Application Priority Data
Aug. 31, 2006 (JP) .............................. 2006-234958

(51) Int. Cl.
*G11B 5/65* (2006.01)
(52) U.S. Cl. .................................... 428/836.2
(58) Field of Classification Search ............... 252/62.58, 252/62.56; 428/402, 403, 702, 836.1, 836.2, 428/836.3
See application file for complete search history.

(56) References Cited

U.S. PATENT DOCUMENTS 4,112,187 A * 9/1978 Asakura et al. ........... 428/475.5
4,232,071 A * 11/1980 Terada et al. ............. 428/836.2
4,586,092 A * 4/1986 Martens et al. ............... 360/59
6,780,555 B2 * 8/2004 Uchida et al. ............ 430/106.2
2005/0069705 A1 * 3/2005 Shimamura et al. ......... 428/403

FOREIGN PATENT DOCUMENTS

JP 2006-96907 10/2007

OTHER PUBLICATIONS

Kelm et al. "Synthesis and Structural Analysis of ε-Fe2O3", Z. Anorg. Allg. Chem., vol. 631, p. 2383-2389, Jun. 2005.*
M. Villafuerte-Castrojón et al., "Synthesis and AC magnetic susceptibility measurements of Fe(2-x)AlxO3 compounds" Journal of Magnetism and Magnetic Materials 272-276 (2004) 837-839.*
S. Fysh et al., "Aluminous Hematite: A Mössbauer Study" Phys. Chem. Minerals 8 (1982) 257-267.*

(Continued)

*Primary Examiner*—Holly Rickman
*Assistant Examiner*—Lisa Chau
(74) *Attorney, Agent, or Firm*—Clark & Brody (57) ABSTRACT

A magnetic material is provided that has an iron oxide phase whose principal phase is a crystal of a structure which has the same space group as $\varepsilon\text{-}Fe_2O_3$ crystal and in which Al is substituted for a portion of the Fe sites of the $\varepsilon\text{-}Fe_2O_3$ crystal. The molar ratio of Al to Fe in the iron oxide phase, when expressed as Al:Fe=x:(2−x), satisfies $0 \leq x \leq 1$. The value of x is preferably in the range of 0.3 to 0.7. The average particle diameter of the powder determined from a TEM image is preferably 5 to 200 nm, more preferably 10 to 100 nm. The magnetic material has very high practical value because it enables the extremely high coercive force Hc of the $\varepsilon\text{-}Fe_2O_3$ crystal to be regulated to a level enabling utilization in magnetic recording medium and various other applications. The magnetic powder can be produced by a method combining the reverse micelle method and the sol-gel method.

16 Claims, 8 Drawing Sheets

OTHER PUBLICATIONS

J. Jin et al., "Giant Coercive Field of Nanometer-Sized Iron Oxide**", Advanced Materials, 2004, 16, No. 1, Jan. 5, pp. 48-51.

J. Jin et al., "Formation of spherical and rod-shaped $\epsilon$-$Fe_2O_3$ nanocrystals with a large coercive field", J. Mater. Chem., 2005, 15, pp. 1067-1071.

S. Sakurai et al., "Reorientation Phenomenon in a Magnetic Phase of $\epsilon$-$Fe_2O_3$ Nanocrystal", Journal of Physical Society of Japan, vol. 74, No. 7, Jul. 2005, pp. 1946-1949.

M. Villafuerte-Castrejón et al., "Synthesis of $FeAlO_3$ by Coprecipitation", Key Engineering Materials vols. 206-213 (2002) pp. 1405-1408.

M. Villafuerte-Castrejón et al., "Synthesis and AC magnetic susceptibility measurements of $Fe_{(2-x)}Al_xO_3$ compounds" Journal of Magnetism and Magnet Materials 272-276 (2004) 837-839.

A. Feenstra et al, "An Experimental Study of Fe-Al Solubility in the System Corundum-Hematite up to 40 kbar and 1300° C.", Journal of Petrology vol. 46, pp. 1881-1892, 2005.

J. Jin et al., "Giant Coercive Field of Nanometer-Sized Iron Oxide**", Advanced Materials, 2004, 16, No. 1, Jan. 5, pp. 48-51.

J. Jin et al., "Formation of spherical and rod-shaped $\epsilon$-$Fe_2O_3$ nanocrystals with a large coercive field", J. Mater. Chem., 2005, 15, pp. 1067-1071.

S. Sakurai et al., "Reorientation Phenomenon in a Magnetic Phase of $\epsilon Fe_2O_3$ Nanocrystal", Journal of the Physical Society of Japan, vol. 74, No. 7, Jul. 2005, pp. 1946-1949.

Digests of the 29th Annual Conference on Magnetics in Japan, 29, Sep. 19-22, 2005, p. 371.

\* cited by examiner

MAGNETIC MATERIAL

FIELD OF THE INVENTION

The present invention relates to an $\epsilon\text{-Fe}_2O_3$ system magnetic material.

DESCRIPTION OF THE PRIOR ART

In magnetic recording, recording density must be enhanced while simultaneously reducing noise. For achieving this, it is essential, on the side of the magnetic recording medium, both to maximize the coercive force Hc of the medium and to reduce the size of the magnetic particles comprising the medium, while also promoting their magnetic discreteness. Attention must also be given to ensuring maintenance of a stable recording state notwithstanding magnetic particle size refinement.

It can be noted, for example, that the minimum unit of the magnetic energy ($K_U \times V$) of the magnetically adhered cluster of magnetic particles constituting a recording bit is far larger than the thermal energy ($k_B \times T$) acting to disrupt the recording. Here, $K_U$ is the magnetic anisotropy energy constant, V is the volume of the magnetic cluster, $k_B$ is the Boltzmann constant, and T is absolute temperature (K). The ratio ($K_U \times V$)/($k_B \times T$) is used as an index of how stably the recording state is maintained, with the aim generally being to achieve a ratio of about 60 or more in order for the recording to last up to 10 years. From this, the situation can be said to be that achievement of higher recording density inevitably requires decrease of magnetic cluster volume V and rather increase of magnetic anisotropy energy constant $K_U$. The relationship between $K_U$ and the coercive force Hc is "$K_U$ is proportional to Hc," which means that the higher the desired target recording density is, the greater the Hc of the magnetic material has to be.

It has been reported that recording magnetization diminishes over time even when the values of ($K_U \times V$)/($k_B \times T$) were attained to one lower than 100. This means that for reducing noise, the magnetic anisotropy energy constant $K_U$ is required to be higher in proportion as the need to reduce magnetic cluster volume V increases. Therefore, also from the viewpoint of noise reduction, the need for a magnetic material with a high coercive force Hc increases in proportion as the desired recording density of the magnetic recording medium increases.

References 1 to 4 cited below indicate that $\epsilon\text{-Fe}_2O_3$ has recently been observed to exhibit a huge Hc of 20 kOe at a particle size on the nanometer level. Among polymorphs composed of $Fe_2O_3$ but differing in crystal structure, $\alpha\text{-Fe}_2O_3$ and $\gamma\text{-Fe}_2O_3$ are the most common. However, $\epsilon\text{-Fe}_2O_3$ is still another. As can be seen from References 1 to 4, the crystal structure and magnetic properties of $\epsilon\text{-Fe}_2O_3$ were elucidated only after it became possible to synthesize $\epsilon\text{-Fe}_2O_3$ in a substantially single-phase state, which is quite recent. Owing to its huge Hc, $\epsilon\text{-Fe}_2O_3$ is seen as having high potential for application to the aforesaid high recording density magnetic recording media.

Reference 1: Jian Jin, Shinichi Ohkoshi and Kazuhito Hashimoto, Advanced Materials 2004, 16, No. 1, January 5, pp. 48-51, Reference 2: Jian Jin, Kazuhito Hashimoto and Shinichi Ohkoshi, Journal of Materials Chemistry 2005, 15, pp. 1067-1071, Reference 3: Shunsuke Sakurai, Jian Jin, Kazuhito Hashimoto and Shinichi Ohkoshi, Journal of the Physical Society of Japan, Vol. 74, No. 7, July, 2005, pp. 1946-1949, Reference 4: Digests of the 29th Annual Conference Magnetics in Japan 29, Sep. 19, 2005, 21pPS-16, p. 371.

Practical utilization of a magnetic material having a very high Hc as a recording medium requires a magnetic head that generates a recording magnetic field capable of actually writing information to the medium. Generally, the magnetic field generated by a magnetic head is proportional to the saturation magnetic flux density of the soft magnetic film used in the head. Currently, hard disks are reported to have an Hc on the order of 1.5 to 4.5 kOe ($1.19 \times 10^5 \sim 3.58 \times 10^5$ A/m), but the magnetic heads used to write to these hard disks use materials having a high saturation magnetic flux density of 2.4 T.

Therefore, even if $\epsilon\text{-Fe}_2O_3$ having the huge Hc on the order of 20 kOe ($1.59 \times 10^6$ A/m), as described in References 1 to 3, were to be used as the magnetic recording material of a magnetic recording medium, it would not be possible to actually record on the medium unless there existed a material having a saturation magnetic flux density that was even higher than that of current materials. In other words, prospects for practical utilization of magnetic materials exhibiting huge Hc, such as those mentioned in the foregoing references, are unsure owing to the difficulty of writing data on such materials with a recording head that simply uses a magnetic head material developed to date.

Magnetic recording methods for getting around this problem include thermally-assisted magnetic recording. This technique is based on the concept of writing data on a medium having a large Hc in a state with its Hc lowered by laser heating and then stably retaining the written bits at room temperature. Although thermally-assisted magnetic recording is seen as a promising technology for ultrahigh-density magnetic recording, it is still at the basic feasibility study stage and will take a long time to reach practical utilization. Whether or not the aforesaid $\epsilon\text{-Fe}_2O_3$ is suitable for thermally-assisted magnetic recording has not yet been determined.

Reference 4 teaches that substituting In for a portion of the Fe of the $\epsilon\text{-Fe}_2O_3$ crystal changes the magnetic phase transition temperature (Curie point) and the spin reorientation temperature of the crystal. However, nothing is known, for instance, about how to control required magnetic properties, e.g., magnetic hysteresis behavior and coercive force at room temperature, in a magnetic recording medium whose magnetic layer is constituted using $\epsilon\text{-Fe}_2O_3$.

Through an in-depth study of the $\epsilon\text{-Fe}_2O_3$ crystal, the inventors discovered that when Ga is substituted for a portion of the Fe of the $\epsilon\text{-Fe}_2O_3$ crystal, coercive force decreases with increasing amount of substitution and, at a certain amount of substitution, saturation magnetization becomes higher than that of $\epsilon\text{-Fe}_2O_3$. Based on this finding, the magnetic material was invented that was set out in Japanese Patent Application 2006-96907, which uses a Ga-containing $\epsilon\text{-Fe}_2O_3$ crystal of a structure in which Ga is substituted for a portion of the Fe of the $\epsilon\text{-Fe}_2O_3$ crystal.

The substitutional element Ga is, however, a rare and very expensive metal. Its use in widely utilized magnetic recording media or electromagnetic wave absorbers would therefore be impracticable because of the inevitable high price of the final product.

The present invention is therefore aimed at improving the known $\epsilon\text{-Fe}_2O_3$ crystal of extremely high coercive force Hc so as to provide a magnetic material of high practical value which has a crystal structure that allows the coercive force Hc to be regulated within a range enabling utilization in magnetic recording media and various other magnetic applications and which is markedly lower in cost than the aforesaid Ga-containing $\epsilon\text{-Fe}_2O_3$.

SUMMARY OF THE INVENTION

The inventors found that by substituting Al for some of the Fe sites of the $\epsilon$-$Fe_2O_3$ described in References 1 to 3, coercive force can be controlled by controlling the amount of substitution, without substantially changing the space group of the crystal structure.

Thus, the invention provides a magnetic material having an iron oxide phase whose principal phase is a crystal of a structure which has the same space group as the $\epsilon$-$Fe_2O_3$ crystal and in which Al is substituted for some of the Fe sites of the $\epsilon$-$Fe_2O_3$ crystal, in which iron oxide phase the molar ratio of Al to Fe when expressed as Al:Fe=x:(2−x) satisfies $0 \leq x \leq 1$.

In the magnetic material, the iron oxide phase comprises a portion constituted of one or more of (i) crystal having the same space group as $\alpha$-$Fe_2O_3$, (ii) crystal having the same space group as $\gamma$-$Fe_2O_3$, (iii) crystal having the same space group as $\epsilon$-$Fe_2O_3$, (iv) crystal having the same space group as $Fe_3O_4$, and (v) crystal having the same space group as FeO. "Principal phase" means a crystal among the foregoing (i) to (v) accounting for a molar ratio of the total iron oxide phase of 50 mole % or greater. The molar ratios of the respective crystals can be determined by Rietveld analysis of x-ray diffraction data. In the magnetic material of this invention, the principal phase is an iron oxide having the same space group as the $\epsilon$-$Fe_2O_3$ crystal (i.e., the space group is $Pna2_1$) and a structure in which Al is substituted for a portion of the Fe sites of the $\epsilon$-$Fe_2O_3$ crystal. This iron oxide will hereinafter sometimes be called "Al-containing $\epsilon$-$Fe_2O_3$." As explained further later, when Al-containing $\epsilon$-$Fe_2O_3$ crystal is synthesized by a method combining the reverse micelle method and the sol-gel method, the crystal $\alpha$-$Fe_2O_3$ or other such impurity crystal may be mixed into the iron oxide phase. However, it is also possible to synthesize Al-containing $\epsilon$-$Fe_2O_3$ crystal having a more ideal iron oxide phase in which no such impurity crystal is detected in the x-ray diffraction pattern (see FIG. 1 discussed latter). This invention therefore provides as a particularly ideal magnetic material that has an iron oxide phase comprised of a crystal of a structure which has the same space group as the $\epsilon$-$Fe_2O_3$ crystal and in which Al is substituted for a portion of the Fe sites of the $\epsilon$-$Fe_2O_3$ crystal, in which iron oxide phase the molar ratio of Al to Fe when expressed as Al:Fe=x:(2−x) satisfies $0 \leq x \leq 1$.

The inventors further ascertained that the lattice constants of the Al-containing $\epsilon$-$Fe_2O_3$ principal phase tend to decrease with increasing Al content. This invention utilizes this finding to enable provision of a magnetic material wherein the lattice constants of the Al-containing $\epsilon$-$Fe_2O_3$ principal phase are smaller than that of the $\epsilon$-$Fe_2O_3$ crystal.

Realization of a product exhibiting both a practically utilizable high coercive force Hc and a high saturation magnetization as in good balance is facilitated when the Al and Fe contents of the iron oxide phase are such that when the molar ratio thereof is expressed as Al:Fe=x:(2−x), the value of x is in the approximate range of 0.3 to 0.8. In other words, a magnetic material excellent for use in a magnetic recording medium can be obtained by setting the Al to Fe content ratio to fall at a value of x in the range of 0.3 to 0.8 that is suitable for the purpose at hand The magnetic material of the invention is typically in the form of a magnetic powder. The magnetic powder provided by the invention is, for instance, one comprised of magnetic particles having an average particle diameter of 5 to 200 nm measured from an image of the particles observed using a transmission electron microscope (TEM). The magnetic particles constituting the magnetic powder sometimes have a nonmagnetic compound adhered around the iron oxide phase. For example, when silica is used in a production process combining the reverse micelle method and the sol-gel method, magnetic particles having $SiO_2$ adhered to their surfaces is obtained. Such a nonmagnetic compound can be either left intact or dissolved off, as suitable for the intended use of the magnetic powder.

The magnetic powder can be provided as one comprised of magnetic particles of a single domain structure. A coercive force-controlled magnetic powder can be provided that, as suitable for the intended purpose, has a coercive force at room temperature of 1000-15000 Oe ($7.96 \times 10^4$~$1.19 \times 10^6$ A/m). Within this range, the magnetic powder adjusted to a coercive force of around 2800~7000 Oe ($2.23 \times 10^5$~$5.57 \times 10^5$ A/m) is of particular interest because it exhibits excellent data writability/readability and is a good choice for building recording media e.g., next-generation data storage tapes that require highly reliable data erasure.

This invention also provides a magnetic recording medium magnetic layer comprising a magnetic powder composed substantially of magnetic particles whose principal phase is Al-containing $\epsilon$-$Fe_2O_3$ and whose average particle diameter measured from an image of the particles observed using a TEM is in the range of 5 to 200 nm, which magnetic layer is supported on a substrate with the particle positions fixed to orient their easy magnetization axes in a predetermined direction.

The invention has the following effects.

(1) Because of its very high coercive force Hc near room temperature, the magnetic material helps to improve magnetic recording medium reliability. In addition, the fact that the coercive force of the magnetic material can be controlled by controlling Al content enables provision of a magnetic material whose coercive force is at the upper limit of the usable range, which in turn enables optimum use of the magnetic material even in applications in which $\epsilon$-$Fe_2O_3$ cannot be used because of its excessively high coercive force.

(2) The magnetic material is formed of an iron oxide obtained by oxidizing the iron to the trivalent level, giving it corrosion resistance in an air environment that is much better than that of conventional metal base magnetic materials.

(3) The magnetic material uses inexpensive Al as the substitutional element and therefore achieves a marked reduction in cost compared to $\epsilon$-$Fe_2O_3$ using an expensive element such as Ga is as the substitutional element.

DETAILED DESCRIPTION OF THE INVENTION

As described in the References 1 to 3, $\epsilon$-$Fe_2O_3$ nanoparticles can be obtained by a process step that combines the reverse micelle method and the sol-gel method, and a heat treatment (baking) process step. In the reverse micelle method, two surfactant-containing micelle solutions, comprising micelle solution I (starting material micelle) and micelle solution II (neutralizer micelle), are mixed together, thereby promoting a reaction that precipitates iron hydroxide in the micelle. The sol-gel method provides the iron hydroxide particles generated in the micelle with a silica coating. The coated particles are then separated from the solution and subjected to heat treatment in air at a predetermined temperature in the range 700~1300° C. to thereby obtain $\epsilon$-$Fe_2O_3$ crystal particles.

More specifically, this is carried out as follows, for example.

Iron (III) nitrate as iron source, aluminum (III) nitrate 9-hydrate as a source of Al for replacing a portion of the iron, and a surfactant (cetyl trimethyl ammonium bromide, for example) are dissolved in the aqueous phase of a micelle solution I whose oil-phase is n-octane, and an aqueous solution of ammonia is used as the aqueous phase of a micelle solution II whose oil-phase is also n-octane. An appropriate amount of a nitrate of an alkaline earth metal (such as Ba, Sr, Ca, etc.) can be dissolved in the aqueous phase of the micelle solution I as a shape control agent. The presence of this shape control agent makes it possible to ultimately obtain rod-shaped crystals of Al-containing $\epsilon$-$Fe_2O_3$. When the shape control agent is not present, granular Al-containing $\epsilon$-$Fe_2O_3$ crystal is obtained.

After the micelle solutions I and II have been combined, the sol-gel method is used in parallel. Specifically, a silane (tetraethylorthosilane, for example) is dripped into the combined solution while the solution is stirred to promote the reaction that generates the iron hydroxide in the micelle. As a result, the surface of the iron hydroxide microparticles precipitated in the micelle is coated with silica produced by the hydrolysis of the silane. It is thought that the iron hydroxide has a portion of its Fe replaced with Al, or otherwise that the iron hydroxide and aluminum hydroxide are in a mixed state or that they are in a state of the iron hydroxide being coated with the aluminum hydroxide. Next, silica-coated particles of the iron hydroxide powder entraining Al are separated from the solution and, after being washed with water and dried, are placed in a furnace and heat-treated (baked) in air at 700 to 1300° C. (973 to 1573K), more preferably 900 to 1200° C. (1173 to 1473K), and even more preferably at 950 to 1150° C. (1223 to 1423K). This heat treatment promotes the oxidation reaction in the iron hydroxide particles inside the silica coating, thereby converting the microparticles of iron hydroxide particles entraining Al into microparticles of Al-containing $\epsilon$-$Fe_2O_3$. At the time of the oxidation reaction, the presence of the silica coating not only contributes to the formation of crystals having the same space group as $\epsilon$-$Fe_2O_3$ rather than $\alpha$-$Fe_2O_3$ or $\gamma$-$Fe_2O_3$ but also works to prevent the particles from sintering together. Moreover, the copresence of an appropriate amount of an alkaline earth metal facilitates the growth of rod-shaped Al-containing $\epsilon$-$Fe_2O_3$ particles.

Among polymorphs composed of $Fe_2O_3$ but differing in crystal structure, $\alpha$-$Fe_2O_3$ and $\gamma$-$Fe_2O_3$ are the most common.

Other iron oxides include FeO and $Fe_3O_4$. When the aforesaid Al-containing $\epsilon$-$Fe_2O_3$ is synthesized, iron oxide crystals (impurity crystals) whose space groups differ from that of the $\epsilon$-$Fe_2O_3$ may intermingle therewith. Although the inclusion of such impurity crystals is undesirable from the viewpoint of fully bringing out the properties of the Al-containing $\epsilon$-$Fe_2O_3$ crystal, their presence is acceptable within levels that do not impair the effect of the invention. When the Al-containing $\epsilon$-$Fe_2O_3$ crystal accounts for 75 mole % or more of the iron oxide phase, for example, the magnetic material exhibits excellent magnetic properties difficult to achieve with conventional magnetic materials and can be utilized in a broad range of magnetic applications. Even when the Al-containing $\epsilon$-$Fe_2O_3$ crystal accounts for between 50 mole % and less than 75 mole % of the iron oxide phase, the magnetic material can still serve a purpose so long as it has a saturation magnetization $\theta$s of 2 emu/g (2 A·m$^2$/kg) or greater, because it enables reading of written signals at high intensity by use of the high-sensitivity magnetic read head known as the GMR (giant magnetoresistive) head or the still more sensitive TMR head that utilizes the tunnel effect.

It was found that the coercive force Hc of the invention magnetic material comprising an iron oxide phase having Al-containing $\epsilon$-$Fe_2O_3$ as its principal phase can be controlled by varying the Al content of the iron oxide phase (see Table 1 below). When x in Al:Fe=x:(2−x) used to express the molar ratio of Al to Fe in the iron oxide phase is 0, Hc may become as high as 20 kOe. No currently available magnetic head would be capable of writing recording magnetization to a magnetic recording medium using such a magnetic material. On the other hand, when x exceeds 1, Hc may become about 0 Oe, which is unsuitable for magnetic recording because recorded data would not be stably retained at room temperature.

The saturation magnetization $\sigma$s was observed to exhibit a behavior of assuming maximum value in the composition range in which the value of x in the molar ratio of Al to Fe in the iron oxide phase having Al-containing $\epsilon$-$Fe_2O_3$ as principal phase was near 0.37 (see Table 1 below). In applications that require high saturation magnetization, therefore, it is advantageous to adopt a composition whose x is in the range of 0.25 to 0.45, although the tradeoff with coercive force must also be taken into account.

Figure 1:
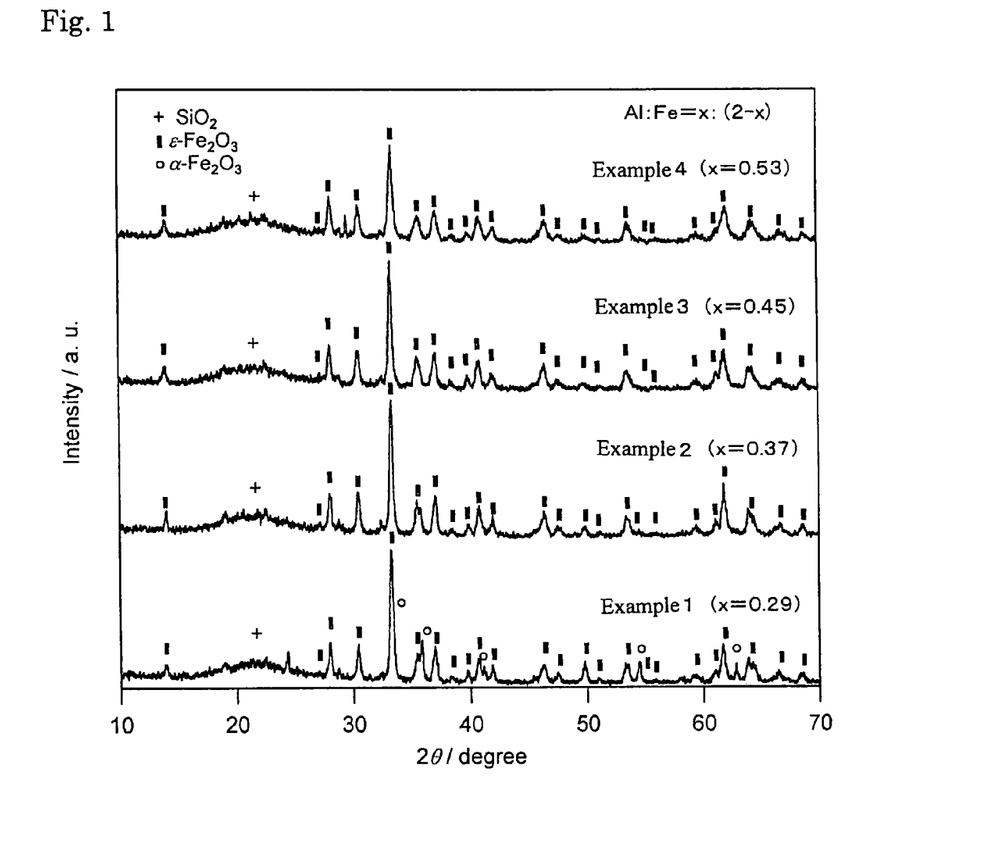
FIG. 1 shows x-ray diffraction patterns of Al-containing $\epsilon$-$Fe_2O_3$ crystals in accordance with the present invention.
Figure 2:
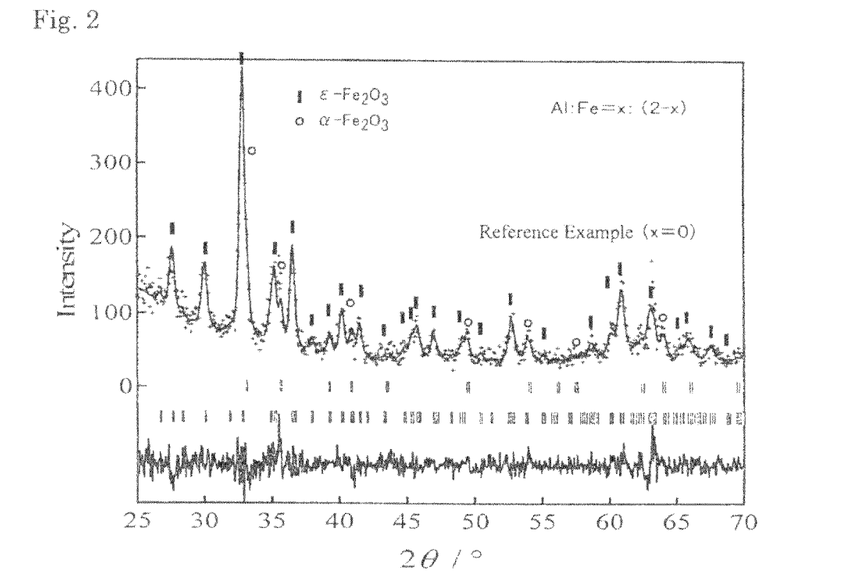
FIG. 2 shows the x-ray diffraction pattern of $\epsilon$-$Fe_2O_3$ crystal used as a control.

The lattice constants of the Al-containing $\epsilon$-$Fe_2O_3$ crystal were observed to exhibit a behavior of growing smaller with increasing amount of Al substitution (see FIGS. 1 and 2 discussed later). This is thought to occur because the $Fe^{3+}$ ion sites are replaced with $Al^{3+}$ ion sites of smaller ionic radius. Among the ionic radii for coordination number 6 shown the ionic radius table of *The Chemical Handbook Revised Third Basic Edition II*, published by Maruzen Co., Ltd. for example, the ionic radius of $Fe^{3+}$ is given as 0.079 nm and the ionic radius of $Al^{3+}$ is given as 0.068 nm.

These behaviors were also observed for the Ga-containing $\epsilon$-$Fe_2O_3$ crystal taught in Japanese Patent Application 2006-96907. However, when Ga is used as the substitutional element, more than about 40 at. % of the Fe atoms have to be replaced with Ga in order to reduce coercive force Hc to a readily usable level of, say, 10 kOe (7.96×10$^5$ A/m) or less. This leads to a marked increase in cost. On this and other points, Al is, from the industrial viewpoint, a very suitable element for use as a substitutional element because of its low price and plentiful reserves, and the fact that it is a chemically stable metal low in toxicity.

The notation $\epsilon$-$Al_yFe_{2-y}O_3$ can be used to reflect the Al substitution ratio of the Al-containing $\epsilon$-$Fe_2O_3$ crystal. Here, it should be noted that the correlation between x of Al:Fe=x:

(2−x) used to express the molar ratio of Al to Fe in the iron oxide phase and y in the $\epsilon\text{-Al}_y\text{Fe}_{2-y}\text{O}_3$ crystal in the iron oxide phase may be somewhat shifted when impurity crystal is present in the iron oxide phase. However, in the case of x=0.45 and x=0.53 in FIG. 1, for example, since substantially no impurity crystal was detected, the value of x determined by composition analysis of the iron oxide phase can be considered to be essentially equal to the value y indicating the composition of the $\epsilon\text{-Al}_y\text{Fe}_{2-y}\text{O}_3$ crystal (x=y).

The magnetic material of the present invention is typically in the form of the magnetic powder obtained by the process discussed above. The diameter of the particles constituting the magnetic powder can be controlled by, for example, regulating the temperature of the heat treatment (baking) in the foregoing process. The average diameter of the magnetic powder particles measured from a TEM image of the particles is preferably 5 to 200 nm, more preferably 5 to 100 nm and still more preferably 10-100 nm. The average particle diameter of most magnetic recording tapes for data backup on the market today is 200 nm or less, which is not considered sufficiently fine. The magnetic powder of this invention can meet the need felt for magnetic recording tapes having still finer magnetic particles. A magnetic layer for magnetic recording constituted using the invention magnetic powder can achieve a high magnetic recording density because the magnetic powder is so fine that the individual particles can assume single domain structures.

However, it should be noted that a magnetic powder containing many particles under 5 nm in diameter experiences magnetic property degradation owing to the superparamagnetic effect of the particles. Particles under 5 nm in diameter, preferably under 10 nm in diameter, are therefore best removed as much as possible.

Determination of average particle diameter can be done by measuring the largest diameter (the long-axis diameter, in the case of rod-shaped particles) of individual particles in a 600,000×TEM image. The average of the particle diameters found for 300 isolated particles is defined as the average particle diameter of the powder concerned. This value will sometimes be called the "TEM average particle diameter" in the following. The magnetic powder of this invention is preferably one whose TEM average particle diameter is 100 nm or less and whose particles each has a single domain structure.

Although the iron oxide phase of the magnetic material ideally consists of a single-phase composition represented by the general formula $\epsilon\text{-Al}_x\text{Fe}_{2-x}\text{O}_3$, $0 \leq x \leq 1$, impurity crystals of crystal structures differing from this ($\alpha\text{-Fe}_2\text{O}_3$ etc.) may, as mentioned earlier, get mixed into the iron oxide phase. The inclusion of such impurity crystals is acceptable within levels that do not impair the effect of the invention. The iron oxide phase may also contain other impurities whose inclusion cannot be avoided during production as well as elements added out of necessity. In addition, nonmagnetic compounds and the like other than the iron oxide phase may also adhere. The inclusion of these elements and compounds is acceptable within levels that do not impair the effect of the invention.

For example, as explained earlier, when Al-containing $\epsilon\text{-Fe}_2\text{O}_3$ is synthesized by a combination of the reverse micelle method and the sol-gel method, the copresence of an appropriate amount of an alkaline earth metal in the micelle makes it easier to ultimately obtain rod-shaped crystals. The alkaline earth metal (such as Ba, Sr, Ca, etc.) added as a shape control agent may remain in the surface region of produced crystal, so that the magnetic material according to the invention may contain such a shape control agent. Thus the invention magnetic material may include at least one alkaline earth metal element. Alkaline earth metal element will sometime be denoted by M in the following. The content thereof expressed as M/(Fe+Al)×100 is at most within the range of not greater than 20 mass %. An alkaline earth metal generally need not be present at a content of greater than 20 mass % to fulfill the function of a shape control agent. A content of 10 mass % or less is preferable.

The silica coating formed on the surface of the iron hydroxide microparticles by the sol-gel method may also remain on the surface of the powder particles after heat treatment (baking). For reasons such as set out below, the presence of a nonmagnetic compound like silica on the surface of the powder particles may be advantageous in the point of improving durability, weatherability, reliability and the like during handling of the magnetic powder or when it is used as a magnetic material in different applications.

Although the fact that Al-containing $\epsilon\text{-Fe}_2\text{O}_3$ is an oxide means that the powder particles of this invention have higher oxidation resistance than metal magnetic particles, Fe itself is an element that reacts readily and, therefore, it is not easy to completely prevent it from complexing or reacting with acid. For example, when a magnetic tape is used for a long time or under high temperature and humidity conditions, the magnetic particles may react with resin and/or dispersant in the tape to form metal complexes. If the metal complexes produced adhere to the surface of the magnetic head, the spacing between the tape and head widens to decrease the recording signal strength. In the worst case, reading of recorded data may become impossible. There may also be cases in which $H_2S$, $Cl_2$, $NO_2$ and other such gas components in the air together with moisture produce corrosive acidic gases, that corrode the magnetic particles. The presence of a chemically stable nonmagnetic compound like silica on the iron oxide phase having Al-containing $\epsilon\text{-Fe}_2\text{O}_3$ as its principal phase produces strong resistance to complexing and acid, thereby enabling the magnetic material to exhibit excellent durability, weatherability and reliability. Nonmagnetic compounds offering these capabilities are not limited to silica but also include, for example, heat-resistant compounds such as alumina and zirconia.

However, an excessive amount of adhered nonmagnetic compound is undesirable because it tends to exacerbate adverse effects, e.g., to cause severe aggregation among the particles. Studies done taking $SiO_2$ as an example showed that the amount of nonmagnetic compound present, expressed as Si/(Fe+Al)×100, is preferably 100 mass % or less.

In some applications, the magnetic powder of this invention can be used in a mixture with a powder whose iron oxide phase is $\epsilon\text{-Fe}_2\text{O}_3$ (powder not added with the substitutional element).

When the invention magnetic powder comprising particles having Al-containing $\epsilon\text{-Fe}_2\text{O}_3$ crystal as their principal phase is to be used to produce the magnetic layer of a coated-type magnetic recording medium, it suffices to affix powder particles having an average diameter of from 5 to 200 nm, as determined by measuring the diameters of individual particles from a TEM image, to a substrate, with the easy magnetization axes of the particle crystals at each site oriented in a prescribed direction.

The magnetic powder of this invention can also be used to produce a magnetic layer suitable for thermally-assisted magnetic recording or next-generation magneto-optical recording. In thermally-assisted magnetic recording, data is recorded on a medium having a high Hc by using a laser to heat the recording medium to thereby lower the Hc enough to write the data. The written data bits are then stably retained at a temperature around room temperature at which the Hc is high. Thermally-assisted magnetic recording is regarded as the ultrahigh-density magnetic recording technology of the future. In magneto-optical recording, a laser beam is used to heat up localized areas of the medium to lower the Hc and enable data to be magnetically written. Stored data is read by projecting a light beam onto the medium and utilizing differences in the polarization angle of the reflected beam due to the direction of magnetization. Thus, it is a magnetic recording system that utilizes the magneto-optical effect. In both thermally-assisted magnetic recording and magneto-optical recording, the recording medium is repeatedly heated and cooled, so the magnetic material used has to be excellent in chemical stability against oxidation corrosion and in thermal stability against crystal transformation and crystallization. The invention magnetic material having Al-containing $\epsilon$-$Fe_2O_3$ as its principal phase satisfies the requirement for chemical stability because it is an iron oxide obtained by oxidizing the iron to the trivalent level, and is also far superior in thermal stability to amorphous magnetic materials capable of achieving high coercive force. Moreover, the fact that the invention magnetic material can be controlled in coercive force Hc and saturation magnetization $\sigma s$ by controlling the amount of Al substitution enables it to be provided as a material suitable for thermally-assisted magnetic recording and next-generation magneto-optical recording.

Particular problems, in the case of thermally-assisted magnetic recording applied to hard disks, are those of the head-disk interface and the heating up of the head. Other problems arise because the magnetic head is separated from the disc surface by only several tens of nanometers, and because the disk surface is coated with lubricant to prevent wear to head. A particular issue is that the lubricant, being organic, is likely to deteriorate if exposed to high temperatures for even a short time. In most cases, a fluorine-base liquid lubricant is used, and although it has a relatively high heat resistance for an organic material, it can only resist temperatures of up to 300° C. (573 K). Taking into consideration the repeated heatings it will be subjected to, even if each heating period is short, it is desirable that its temperature does not exceed 200° C. (473 K). Because such a maximum heating temperature must be set with consideration to the magnetic phase transition temperature of the recording medium, it is desirable from the standpoint of the head-disk interface for the recording medium to have a low magnetic phase transition temperature, a requirement that can be met by the magnetic material of the present invention.

Thus, the usefulness of the magnetic material of the present invention goes beyond its application in high-density magnetic recording media. Namely, owing to its stability as an oxide substance and its outstanding magnetic properties, it also has potential for use in many other applications, including electromagnetic wave absorption materials, nanoscale electronics materials, permanent magnet materials, biomolecular marker agents, and drug carriers.

The synthesis of the Al-containing $\epsilon$-$Fe_2O_3$ crystal of the invention has been described in the foregoing with reference to the use of a reverse micelle method to fabricate the precursor iron hydroxide and aluminum hydroxide microparticles. However, the fabrication method is not limited to the reverse micelle method and any available method capable of fabricating the precursors to a size of under a few hundred nanometers can be adopted. Similarly, while the use of the sol-gel method has been described with reference to providing the precursor particles with a heat-resistant silica coating, the fabrication of the coating is not limited to the described method and another method capable of providing the particles with a heat-resistant coating can be adopted. For example, a powder comprising particles having an iron oxide phase whose principal phase is Al-containing $\epsilon$-$Fe_2O_3$ crystal can also be obtained by forming a heat-resistant coating of alumina, zirconia or the like on the precursor microparticles and subjecting the coating to heat treatment at a predetermined temperature.

EXAMPLES

Example 1

In this Example, $\epsilon$-$Al_{0.29}Fe_{1.71}O_3$ was synthesized by the following procedure:

Step 1

A micelle solution I and a micelle solution II were prepared.

Preparation of Micelle Solution I 6 ml of pure water, 18.3 ml of n-octane and 3.7 ml of 1-butanol were put into a Teflon (Trade Mark) flask, to which were added 0.00240 mole of iron (III) nitrate 9-hydrate and 0.00060 mole of aluminum (III) nitrate 9-hydrate, and the solution was dissolved at room temperature under fully stirring. An amount of a surfactant, cetyl trimethyl ammonium bromide, sufficient to bring the water/surfactant molar ratio to 30 was dissolved in the solution under stirring, thereby obtaining the micelle solution I.

The preparation had an Al to Fe molar ratio expressed as Al:Fe=x:(2−x) where x was 0.40.

Preparation of Micelle Solution II 2 ml of a 25% solution of aqueous ammonia was stirred into 4 ml of pure water. That evening, 18.3 ml of n-octane and 3.7 ml of 1-butanol were added, followed under fully stirring. Cetyl trimethyl ammonium bromide was added to and dissolved in the solution as surfactant in an amount that brought the (pure water+water present in the aqueous ammonia)/surfactant molar ratio to 30, to thereby obtain the micelle solution II.

Step 2

The micelle solution II was then dripped into the micelle solution I under stirring. After this was completed, stirring of the mixed solution was continued for 30 minutes.

Step 3

1.5 ml of tetraethoxysilane was added to the mixed solution obtained in Step 2 under stirring. The stirring was continued for about one day.

Step 4

The solution obtained by Step 3 was centrifuged and the solid component thus separated was recovered and washed a plurality of times using a mixed solution of chloroform and methanol.

Step 5

After the solid component obtained in Step 4 was dried, it was placed in a furnace and subjected to 4 hours of heat treatment at 1150° C. in air.

Step 6

The heat-treated powder obtained in Step 5 was added to, and stirred for 24 hours in, one liter of 2 mole/L aqueous solution of NaOH to remove any silica that might be present on the surface of the particles. The particles were then filtered, washed and dried.

Figure 5A:
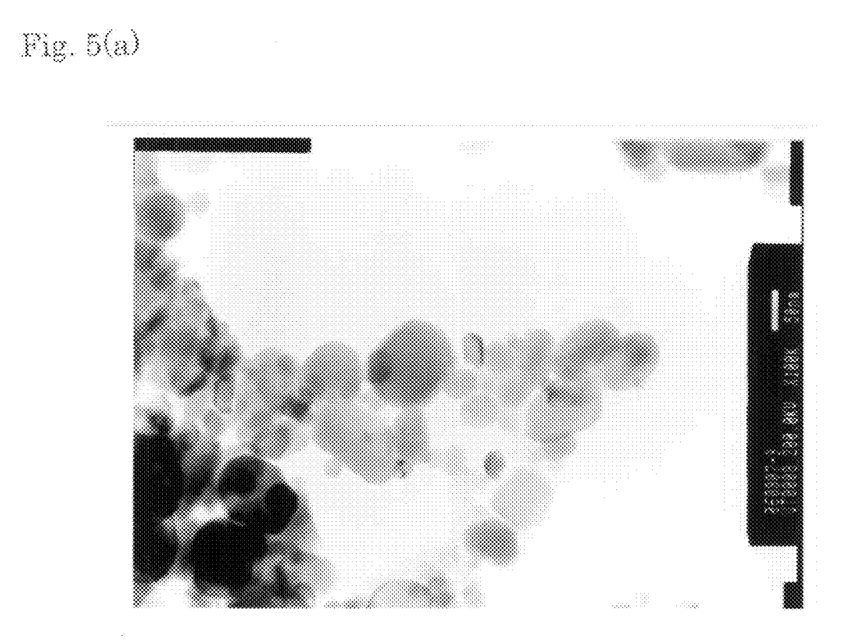
FIG. 5(a) is a TEM image of powder particles obtained in Example 1.

The above Steps 1 to 6 afforded a magnetic powder specimen. A TEM image of the powder is shown in FIG. 5(a). Its particles had a TEM average diameter of 45.0 nm, standard deviation of 28.6 nm, and coefficient of variation defined as (standard deviation/TEM average particle diameter)×100 of 63.7%.

The specimen was subjected to powder X-ray diffraction (XRD: Rigaku Corporation, RINT 2000, using CuKα radiation at a voltage of 40 kV and a current of 30 mA) to obtain the diffraction pattern shown at the bottom of FIG. 1. This diffraction pattern includes peaks corresponding to those of the diffraction pattern of the $\epsilon$-Fe$_2$O$_3$ crystal structure (orthorhombic, space group Pna2$_1$), demonstrating that this crystal constituted the main phase. The lattice constants of the sample were: a axis: 0.5046 nm, b axis: 0.8681 nm, c axis: 0.9367 nm. The only other magnetic crystal peaks observed were weak ones corresponding to the structure of the impurity crystal $\alpha$-Fe$_2$O$_3$ (orthohexagonal, space group R-3c). Rietveld analysis showed that the proportion of the iron oxide phase accounted for by crystal having the same space group (Pna2$_1$) as $\epsilon$-Fe$_2$O$_3$ was 78 mole % and that accounted for by crystal having the same space group (R-3c) as $\alpha$-Fe$_2$O$_3$ was 22 mole %.

While the preparation from which the specimen was obtained had an Al to Fe molar ratio expressed as Al:Fe=x:(2−x) where x was 0.40, fluorescent X-ray analysis (JEOL Ltd. JSX-3220) of the specimen gave x=0.29, indicating that Al-containing $\epsilon$-Fe$_2$O$_3$ having the composition $\epsilon$-Al$_{0.29}$Fe$_{1.71}$O$_3$ was synthesized. The reason for the Al concentration being lower than in the preparation is thought to be that some of the added Al, which readily reacts with Si, was consumed by reaction with Si present on the particle surface in the sol-gel process to form part of a nonmagnetic compound that was dissolved and removed in Step 6. The same reasoning is thought to apply to the Examples that follow.

Figure 3:
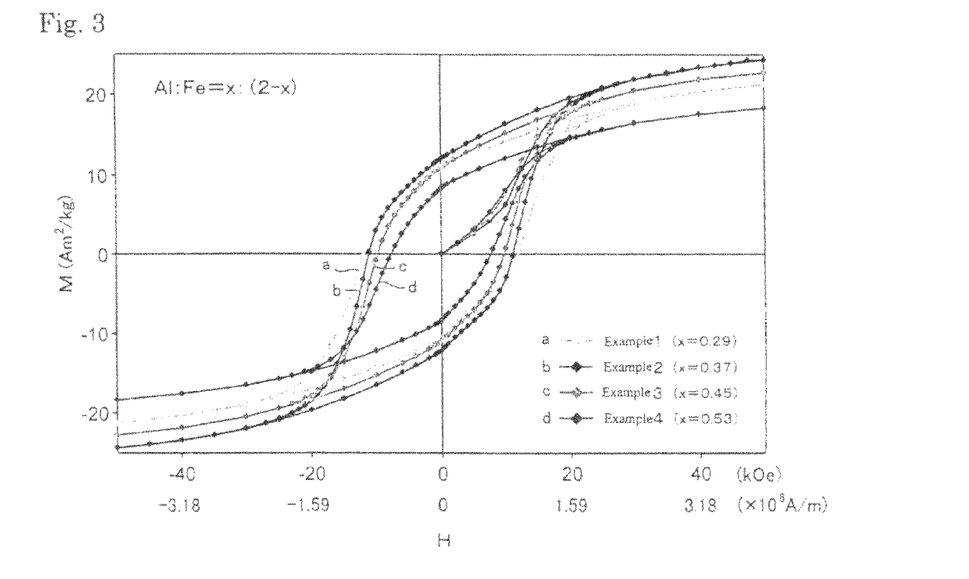
FIG. 3 shows the magnetization hysteresis loops of invention magnetic powders whose principal phase is Al-containing $\epsilon$-$Fe_2O_3$.
Figure 4:
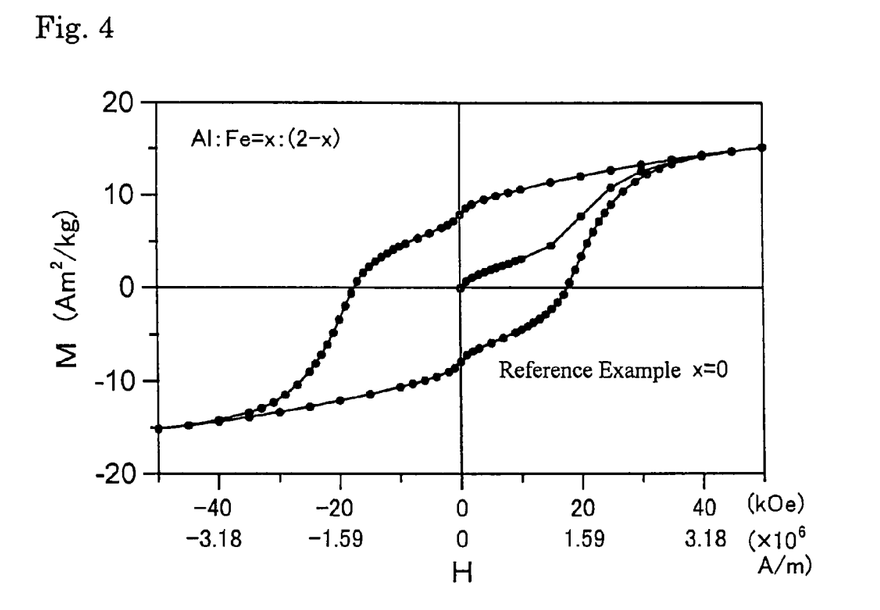
FIG. 4 shows the magnetization hysteresis loop of a magnetic powder composed of $\epsilon$-$Fe_2O_3$ used as a control.

The magnetization hysteresis loop of the specimen at room temperature (300 K) was measured. The results are shown in FIG. 3. The magnetization hysteresis loop measurement was done using a superconducting quantum interference device magnetometer (SQUID: Quantum Design MPMS7) under the condition of an applied magnetic field of 50 kOe (3.98× 10$^6$ A/m). The measured magnetic moment was normalized to the mass of the iron oxide, at which time all Si, Fe and Al in the specimen was assumed to be present as SiO$_2$, and Al$_x$Fe$_{2-x}$O$_3$ and the content of each the elements was determined by fluorescent X-ray analysis. The coercive force Hc, saturation magnetization $\sigma$s, and remanent magnetization $\sigma$r measured under the condition of an applied magnetic field of 50 kOe (3.98×10$^6$ A/m) are shown in Table 1 (together with the corresponding values obtained in the Examples set out below).

Example 2

In this Example, $\epsilon$-Al$_{0.37}$Fe$_{1.63}$O$_3$ was synthesized.

This was done by the same procedure as Example 1, except that in the preparation of the micelle solution I, the amount of iron (III) nitrate 9-hydrate added was changed from 0.00240 mole to 0.00225 mole, and the amount of aluminum (III) nitrate 9-hydrate added was changed from 0.00060 mole to 0.000750 mole. The preparation had an Al to Fe molar ratio expressed as Al:Fe=x:(2−x) where x was 0.50.

Figure 5B:
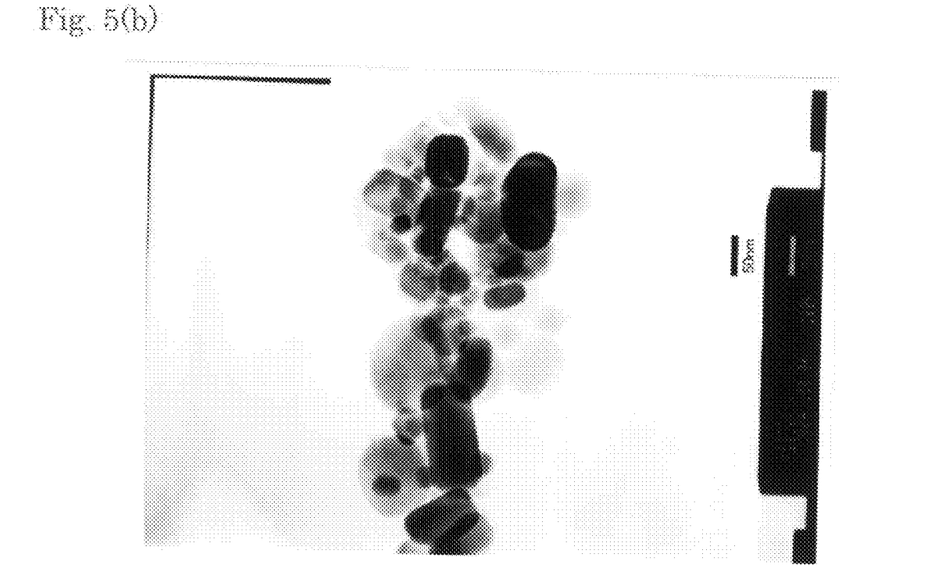
FIG. 5(b) is a TEM image of powder particles obtained in Example 2.

A TEM image of the specimen (magnetic powder) obtained is shown in FIG. 5(b). The TEM average particle diameter was 52.5 nm, the standard deviation was 32.4 nm, and the coefficient of variation was 61.6%.

The specimen was subjected to powder X-ray diffraction under the same conditions as set out in Example 1. The diffraction pattern obtained is the second from the bottom in FIG. 1. This diffraction pattern includes peaks corresponding to those of the diffraction pattern of the $\epsilon$-Fe$_2$O$_3$ crystal structure (orthorhombic, space group Pna2$_1$). The lattice constants of the sample were: a axis: 0.5041 nm, b axis: 0.8668 nm, c axis: 0.9346 nm. Rietveld analysis showed that the proportion of the iron oxide phase accounted for by crystal having the same space group (Pna2$_1$) as $\epsilon$-Fe$_2$O$_3$ was 95 mole % and that accounted for by crystal having the same space group (R-3c) as $\alpha$-Fe$_2$O$_3$ was 5 mole %.

While the preparation from which the specimen was obtained had an Al to Fe molar ratio expressed as Al:Fe=x:(2−x) where x was 0.50, fluorescent X-ray analysis of the specimen in the manner set out above gave x=0.37, indicating that Al-containing $\epsilon$-Fe$_2$O$_3$ having the composition $\epsilon$-Al$_{0.37}$Fe$_{1.63}$O$_3$ was synthesized.

The magnetization hysteresis loop of the specimen at room temperature (300 K) was measured by the method set out in Example 1. The results are shown in FIG. 3.

Example 3

In this Example, $\epsilon$-Al$_{0.45}$Fe$_{1.55}$O$_3$ was synthesized.

This was done by the same procedure as Example 1, except that in the preparation of the micelle solution I, the amount of iron (III) nitrate 9-hydrate added was changed from 0.00240 mole to 0.00210 mole, and the amount of aluminum (III) nitrate 9-hydrate added was changed from 0.00060 mole to 0.00090 mole. The preparation had an Al to Fe molar ratio expressed as Al:Fe=x:(2−x) where x was 0.60.

Figure 5C:
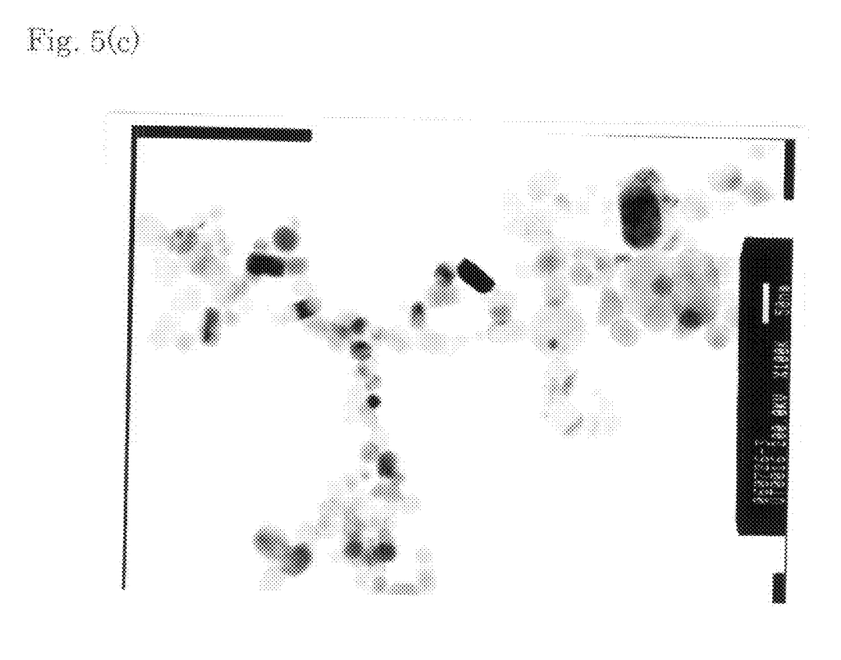
FIG. 5(c) is a TEM image of powder particles obtained in Example 3.

A TEM image of the specimen (magnetic powder) obtained is shown in FIG. 5(c). The TEM average particle diameter was 29.9 nm, the standard deviation was 15.57 nm, and the coefficient of variation was 52.0%.

The specimen was subjected to powder X-ray diffraction under the same conditions as set out in Example 1. The diffraction pattern obtained is the third from the bottom in FIG. 1. This diffraction pattern includes peaks corresponding to those of the diffraction pattern of the $\epsilon$-Fe$_2$O$_3$ crystal structure (orthorhombic, space group Pna2$_1$). The lattice constants of the sample were: a axis: 0.5037 nm, b axis: 0.8656 nm, c axis: 0.9336 nm. No impurity crystal constituent of the iron oxide phase was detected.

While the preparation from which the specimen was obtained had an Al to Fe molar ratio expressed as Al:Fe=x:(2−x) where x was 0.60, fluorescent X-ray analysis of the specimen in the manner set out above gave x=0.45, indicating that Al-containing $\epsilon$-Fe$_2$O$_3$ having the composition $\epsilon$-Al$_{0.45}$Fe$_{1.55}$O$_3$ was synthesized.

The magnetization hysteresis loop of the specimen at room temperature (300 K) was measured by the method set out in Example 1. The results are shown in FIG. 3.

Example 4

In this Example, $\epsilon$-Al$_{0.53}$Fe$_{1.47}$O$_3$ was synthesized.

This was done by the same procedure as Example 1, except that in the preparation of the micelle solution I, the amount of iron (III) nitrate 9-hydrate added was changed from 0.00240 mole to 0.001950 mole, and the amount of aluminum (III) nitrate 9-hydrate added was changed from 0.00060 mole to 0.001050 mole. The preparation had an Al to Fe molar ratio expressed as Al:Fe=x:(2−x) where x was 0.70.

Figure 5D:
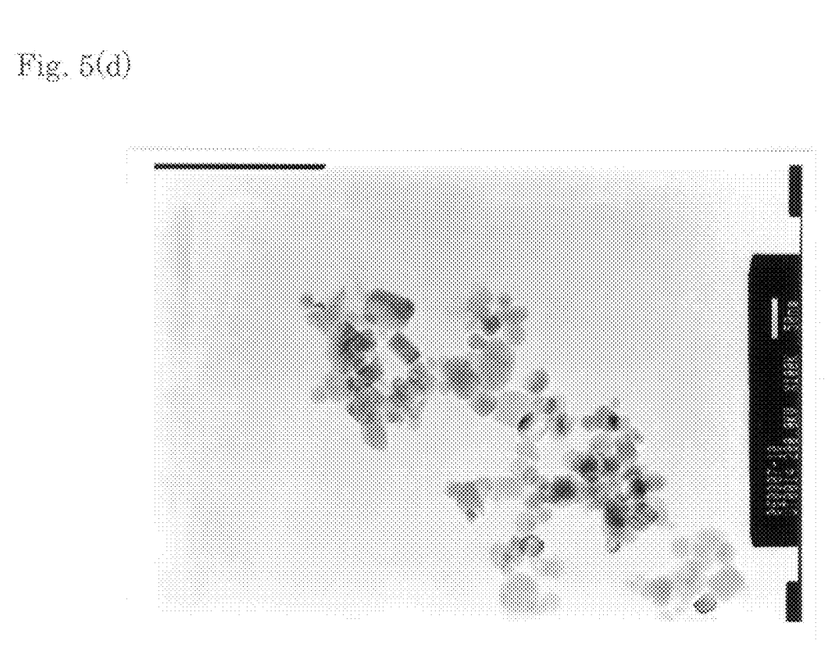
FIG. 5(d) is a TEM image of powder particles obtained in Example 4.

A TEM image of the specimen (magnetic powder) obtained is shown in FIG. 5(d). The TEM average particle diameter was 28.3 nm, the standard deviation was 14.75 nm, and the coefficient of variation was 52.1%.

The specimen was subjected to powder X-ray diffraction under the same conditions as set out in Example 1. The diffraction pattern obtained is the top one in FIG. 1. This diffraction pattern includes peaks corresponding to those of the diffraction pattern of the $\epsilon$-Fe$_2$O$_3$ crystal structure (orthorhombic, space group Pna2$_1$). The lattice constants of the sample were: a axis: 0.5022 nm, b axis: 0.8618 nm, c axis: 0.93050 n. No impurity crystal constituent of the iron oxide phase was detected.

While the preparation from which the specimen was obtained had an Al to Fe molar ratio expressed as Al:Fe=x: (2−x) where x was 0.70, fluorescent X-ray analysis of the specimen in the manner set out above gave x=0.53, indicating that Al-containing $\epsilon$-Fe$_2$O$_3$ having the composition $\epsilon$-Al$_{0.53}$Fe$_{1.47}$O$_3$ was synthesized.

The magnetization hysteresis loop of the specimen at room temperature (300 K) was measured by the method set out in Example 1. The results are shown in FIG. 3.

Reference Example

In this example, $\epsilon$-Fe$_2$O$_3$ without added substitutional element was synthesized.

This was done by the same procedure as Example 1, except that in the preparation of the micelle solution I, the amount of iron (III) nitrate 9-hydrate added was changed from 0.00240 mole to 0.0030 mole, and no aluminum (III) nitrate 9-hydrate was added. The preparation had an Al to Fe mole ratio expressed as Al:Fe=x:(2−x) where x was 0.

Figure 5E:
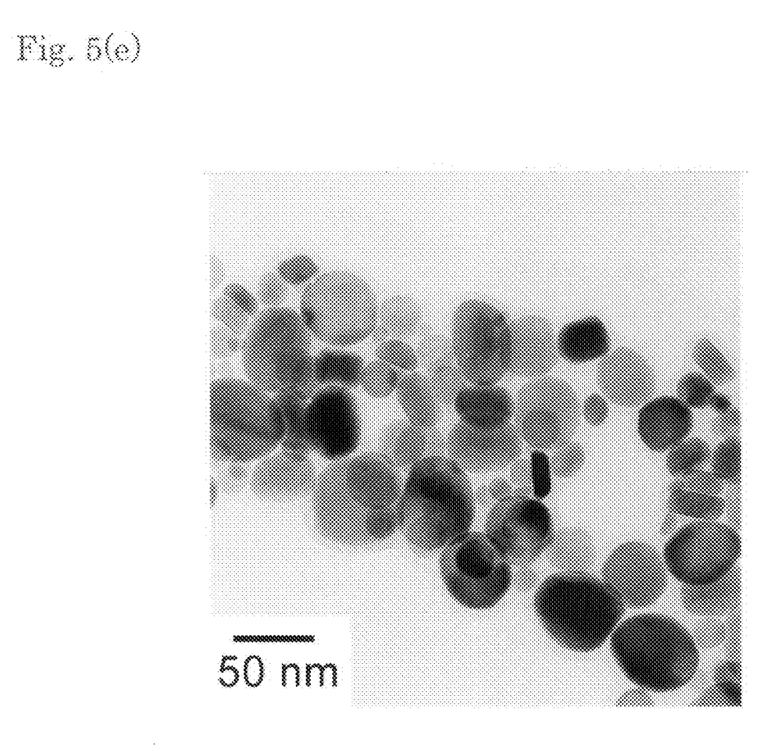
FIG. 5(e) is a TEM image of powder particles obtained in Example 5.

A TEM image of the specimen (magnetic powder) obtained is shown in FIG. 5(e). The TEM average particle diameter was 48.2 nm, the standard deviation was 33.6 nm, and the coefficient of variation was 69.7%.

The specimen was subjected to powder X-ray diffraction under the same conditions as set out in Example 1. The diffraction pattern obtained is show in FIG. 2. This diffraction pattern includes peaks corresponding to orthorhombic structure and space group Pna2$_1$. The lattice constants of the crystal were: a axis: 0.5099 nm, b axis: 0.8813 nm, c axis: 0.9483 nm. The only other iron oxide crystal peaks observed were weak ones corresponding to the structure of the impurity crystal $\alpha$-Fe$_2$O$_3$ (orthohexagonal, space group R-3c). Rietveld analysis showed that the proportion of the iron oxide phase accounted for by crystal having the same space group (Pna2$_1$) as $\epsilon$-Fe$_2$O$_3$ was 87 mole % and that accounted for by crystal having the same space group (R-3c) as $\alpha$-Fe$_2$O$_3$ was 13 mole %.

properties can be controlled by controlling the Al content. Moreover, it can be seen from FIGS. 1 and 2 that as the Al content (value of x) increases, the positions of the x-ray diffraction peaks in the same index plane shift in the direction of wider angle θ, indicating a tendency for the lattice constants to diminish.

What is claimed is:

1. A magnetic material having an iron oxide phase whose principal phase is a crystal of a structure which has the same space group as $\epsilon$-Fe$_2$O$_3$ crystal and in which Al is substituted for a portion of the Fe sites of the $\epsilon$-Fe$_2$O$_3$ crystal, in which iron oxide phase the molar ratio of Al to Fe when expressed as Al:Fe=x:(2−x) satisfies 0<x<0.8.

2. A magnetic material having an iron oxide phase comprising a crystal of a structure which has the same space group as $\epsilon$-Fe$_2$O$_3$ crystal and in which Al is substituted for some Fe sites of the $\epsilon$-Fe$_2$O$_3$ crystal, in which iron oxide phase a molar ratio of Al to Fe when expressed as Al:Fe=x:(2−x) satisfies 0<x<0.8.

3. The magnetic material according to claim 1, wherein the value of x in the expression representing the molar ratio of Al to Fe is 0.3 to 0.8.

4. The magnetic material according to claim 1, wherein lattice constants of the crystal having the same space group as $\epsilon$-Fe$_2$O$_3$ crystal assume a value smaller than lattice constants of $\epsilon$-Fe$_2$O$_3$crystal.

5. The magnetic material according to claim 1, wherein an average particle diameter measured from a TEM image is in a range of 5 to 200 nm.

6. The magnetic material according to claim 1, comprising magnetic particles having a nonmagnetic compound adhered around the iron oxide phase, which magnetic material has an average particle diameter measured from a TEM image in a range of 5 to 200 nm.

7. The magnetic material according to claim 1, comprising magnetic particles having an average particle diameter measured from a TEM image in a range of 5 to 200 nm and a coercive force at room temperature of 1000-15000 Oe (7.96 ×10$^4$ ~1.19 ×10$^6$ A/m).

TABLE 1

| | | | Magnetic properties | | | |
|---|---|---|---|---|---|---|
| | | | Coercive force Hc | | Saturation magnetization | Remanent magnetization |
| | Preparation x†) | Analysis x††) | kOe | ×10$^6$ A/m | σs (A · m$^2$/kg) | σr (A · m$^2$/kg) |
| Ref. Example | 0 | 0 | 17.6 | 1.40 | 15.1 | 7.8 |
| Example 1 | 0.40 | 0.29 | 11.8 | 0.94 | 21.3 | 10.7 |
| Example. 2 | 0.50 | 0.37 | 11.1 | 0.88 | 24.3 | 12.1 |
| Example. 3 | 0.60 | 0.45 | 9.7 | 0.77 | 22.8 | 10.9 |
| Example. 4 | 0.70 | 0.53 | 7.6 | 0.61 | 18.4 | 8.3 |

†) Value of x when molar ratio of Al to Fe at preparation is expressed as Al:Fe = x:(2 − x)

††) Value of x when molar ratio of Al to Fe of analysis results is expressed as Al:Fe = x:(2 − x)

Table 1 shows that the coercive force Hc of a magnetic material whose principal phase is Al-containing $\epsilon$-Fe$_2$O$_3$ can be lowered by increasing the amount of Al substituted for a portion of the Fe (i.e., by increasing the value of x). Moreover, in the analysis results, the saturation magnetization as is seen to maximize around x=0.37. In other words, the magnetic 8. The magnetic material according to claim 1, comprising magnetic particles having a single domain structure and an average particle diameter measured from a TEM image in a range of 5 to 200 nm.

9. A magnetic recording medium magnetic layer, comprising a magnetic powder according claim 1 whose average particle diameter measured from an image of the particles observed using a TEM is in the range of 5 to 200 nm, which magnetic layer is supported on a substrate with the particle positions fixed to orient their easy magnetization axes in a predetermined direction.

10. The magnetic material according to claim 2, wherein the value of x in the expression representing the molar ratio of Al to Fe is 0.3 to 0.8.

11. The magnetic material according to claim 2, wherein lattice constants of the crystal having the same space group as $\epsilon\text{-}Fe_2O_3$ crystal assume a value smaller than lattice constants of $\epsilon\text{-}Fe_2O_3$ crystal.

12. The magnetic material according to claim 2, wherein an average particle diameter measured from a TEM image is in a range of 5 to 200 nm.

13. The magnetic material according to claim 2, comprising magnetic particles having a nonmagnetic compound adhered around the iron oxide phase, which magnetic material has an average particle diameter measured from a TEM image in a range of 5 to 200 nm.

14. The magnetic material according to claim 2, comprising magnetic particles having an average particle diameter measured from a TEM image in a range of 5 to 200 nm and a coercive force at room temperature of 1000-15000 Oe ($7.96 \times 10^4 \sim 1.19 \times 10^6$ A/m).

15. The magnetic material according to claim 2, comprising magnetic particles having a single domain structure and an average particle diameter measured from a TEM image in a range of 5 to 200 nm.

16. A magnetic recording medium magnetic layer, comprising a magnetic powder according claim 2 whose average particle diameter measured from an image of the particles observed using a TEM is in the range of 5 to 200 nm, which magnetic layer is supported on a substrate with the particle positions fixed to orient their easy magnetization axes in a predetermined direction.

* * * * *

UNITED STATES PATENT AND TRADEMARK OFFICE
CERTIFICATE OF CORRECTION

PATENT NO.         : 7,781,082 B2
APPLICATION NO.    : 11/892911
DATED              : August 24, 2010
INVENTOR(S)        : Ohkoshi et al.

It is certified that error appears in the above-identified patent and that said Letters Patent is hereby corrected as shown below:

On the title page:

In the Abstract:

Line 6: "expressed as Al:Fe=x:(2-x), satisfies $0 \leqq x \leqq 1$. The value of x"
Should read:
"expressed as Al:Fe=x:(2-x), satisfies $0 < x < 1$. The value of x"

Page 2: OTHER PUBLICATIONS
There are duplicate listings of the two "J. Jin et al." and of the "S. Sakurai et al." Non-Patent Documents.

Column 3, line 14:
"$0 \leqq x \leqq$"
Should read:
"$0 < x <$"

Column 3, line 44:
"expressed as Al:Fe=x:(2-x) satisfies $0 \leqq x \leqq 1$."
Should read:
"expressed as Al:Fe=x:(2-x) satisfies $0 < x < 1$."

Column 13, line 2:
"0.93050 n. No impurity crystal constituent of the iron oxide"
Should read:
"0.93050 nm. No impurity crystal constituent of the iron oxide"

Signed and Sealed this
Third Day of May, 2011

David J. Kappos
*Director of the United States Patent and Trademark Office*

CERTIFICATE OF CORRECTION (continued)
U.S. Pat. No. 7,781,082 B2

Column 13, line 66:
"in the analysis results, the saturation magnetization as is seen"
Should read:
"in the analysis results, the saturation magnetization σs is seen"

Column 3, line 53:
"tization as in good balance is facilitated when the Al and Fe"
Should read:
"tization σs in good balance is facilitated when the Al and Fe"

Column 6, line 17:
"tion θs of 2 emu/g (2 A·m$^2$/kg) or greater, because it enables"
Should read:
"tion σs of 2 emu/g (2 A·m$^2$/kg) or greater, because it enables"

Column 7, line 46:
"the general formula ε-Al$_x$Fe$_{2-x}$O$_3$, 0≦x≦1, impurity crystals"
Should read:
"the general formula ε-Al$_x$Fe$_{2-x}$O$_3$, 0<x<1, impurity crystals"

Column 11, line 39:
"saturation magnetization σs, and remanent magnetization or"
Should read:
"saturation magnetization σs, and remanent magnetization σr"